UNITED STATES PATENT OFFICE.

JACOB G. LIPMAN, OF NEW BRUNSWICK, NEW JERSEY.

FERTILIZER COMPOSITION.

1,235,906. Specification of Letters Patent. Patented Aug. 7, 1917.

No Drawing. Application filed September 6, 1916. Serial No. 118,612.

*To all whom it may concern:*

Be it known that I, JACOB G. LIPMAN, a citizen of the United States, residing at New Brunswick, in the county of Middlesex and State of New Jersey, have invented certain new and useful Improvements in Fertilizer Compositions, of which the following is a full, clear, and exact description.

This invention relates to a new composition of matter, particularly useful for agricultural purposes.

In the fertilization of soil, ground phosphate rock has been extensively used, but in order to make the ground rock of any value as a quickly available fertilizer it is first necessary to treat it with sulfuric acid to set free a soluble phosphate commonly designated by chemists as citrate soluble phosphate. The expense of such treatment and the rising cost of sulfuric acid make the expense of obtaining these citrate soluble phosphates relatively very high. With my improved composition cheap raw materials may be used and under proper conditions, to some of which I shall refer, the conversion of the insoluble phosphate into a soluble phosphate may be carried out in the soil itself.

In preparing my improved composition, I take sulfur, preferably finely divided, and mix it with ground phosphate rock or the like, e. g., ground bone or ground basic slag; in fact any phosphate carrying material may be used. To these ingredients I add soil in which there has been developed a high degree of bacterial efficiency for oxidizing sulfur into sulfuric acid; which may be attained in any fertile soil by application (preferably repeated at intervals) of sulfur and calcium carbonate, or other substances capable of forming neutral or acid salts when acted upon by sulfuric acid. The proportions which I have found most satisfactory in practice are, one part of soil, one part of sulfur and two to ten parts of phosphate carrying material; but the ratio may be varied widely, particularly to suit different conditions of soil, material, etc.

The mixture may be applied direct to the soil in the same manner as other fertilizers are applied, without further treatment. The application may be made annually or if desired at more frequent periods and the amounts applied may vary within wide limits. With certain soil conditions 100 lbs. per acre or even less has been found sufficient, whereas with other soils 1000 lbs. per acre may be used; the conditions being the same as those well understood with reference to the application of the present commercial phosphate fertilizers.

After the mixture has been applied to the soil, the bacterial activity starts an oxidation of sulfur in the mixture. The oxidized sulfur reacts with the insoluble phosphate materials and converts them into soluble phosphates in which form the phosphorous therein is available for plant fertilization. It is possible to substitute another bacteria-carrier for the soil described, although that is generally preferable. It is also practicable to isolate the micro-organisms which are able to oxidize sulfur to sulfuric acid and to utilize them in pure culture for hastening sulfur oxidation in previously untreated soils. This may be done by the addition of such micro-organisms, without soil as a carrier, to the mixture of sulfur and phosphate rock.

In the preparation of my fertilizer mixture, I do not wish to be limited to the use of pure sulfur, since varying sulfur carrying materials, for example the sulfids may be employed.

What I claim as my invention is:—

1. A fertilizer mixture composed of a sulfur carrying material, a phosphate carrying material and a material containing bacteria having the property of promoting the oxidation of sulfur.

2. A fertilizer mixture comprising a finely divided sulfur carrying material intermixed with a finely divided insoluble phosphate material and a material containing bacteria having the property of promoting the oxidation of sulfur.

3. A fertilizer mixture comprising finely divided sulfur and finely divided phosphate material and containing bacteria having the property of promoting the oxidation of sulfur.

4. A composition of matter for fertilizing soils comprising one part of finely divided sulfur, one part of bacterially active material and from two to ten parts of insoluble phosphate carrying material.

5. A composition of material for fertilizing soils consisting of one part of finely divided sulfur and from two to ten parts of ground phosphate rock, mixed with soil previously rendered bacterially active by the application of sulfur and a substance, capable of forming neutral or acid salts when acted upon by sulfuric acid.

In testimony whereof I hereunto affix my signature in the presence of two subscribing witnesses.

JACOB G. LIPMAN.

Witnesses:
ROSE B. SCHNIFF,
H. M. SCHROEDER.